3,146,176
STABILIZATION OF UNSATURATED NITRILES DURING DISTILLATION BY THE ADDITION OF p-AMINOPHENOL AND A SODIUM SALT REDUCING AGENT
Robert G. Roth, Dickinson, and Thomas C. Singleton, Texas City, Tex., assignors to Monsanto Company, a corporation of Delaware
No Drawing. Filed Dec. 20, 1961, Ser. No. 160,896
7 Claims. (Cl. 202—57)

The present invention relates to the stabilization of unsaturated nitriles. More particularly, it relates to the inhibition of polymerization of $\alpha,\beta$-unsaturated nitriles.

The unsaturated nitriles, particularly the $\alpha,\beta$-unsaturated nitriles, are extremely useful chemical compounds. Considerable quantities of these materials are used for the preparation of synthetic rubbers and various types of synthetic resins. These compounds, however, possess a characteristic which all too frequently hampers not only their utility but also the purification techniques commonly employed in their preparation. All these compounds exhibit a tendency to polymerize quite rapidly at elevated temperatures. Such polymerization results in darkening of the unsaturated nitrile monomer and ultimately in the formation of solid polymer contaminant.

Since most applications or uses of the unsaturated nitriles require high-purity products, these polymerization characteristics present a serious problem in the preparation of the finished grade monomers. Furthermore, since distillation at elevated temperatures is the commonly used purification technique, the purification process is seriously hampered by the formation of solid polymer which accumulates in the equipment ultimately plugging the system. This problem is also aggravated by the fact that impurities present in the crude unsaturated nitriles are frequently compounds of the type which accelerate polymerization.

Attempts to eliminate this problem have been made in the past by the addition of inhibitors which retard or prevent the polymerization of unsaturated nitriles. Unfortunately, the inhibitors heretofore employed, while exhibiting some effect, have not proved to be completely satisfactory particularly when employed with crude nitriles. Many known inhibitors which are highly effective for preserving the pure monomers against polymerization over extended periods of storage are relatively ineffective when used with the less pure nitriles in distillation purification techniques. p-Aminophenol, for example, is such an inhibitor. However, it has now been discovered that the effectiveness of p-aminophenol as a polymerization inhibitor in the distillation of crude $\alpha,\beta$-unsaturated nitriles can be significantly improved if a reducing agent such as sodium thiosulfate, sodium bisulfite or sodium oxalate is used in conjunction with the aminophenol.

According to the present invention, polymerization of crude unsaturated nitriles, particularly $\alpha,\beta$-unsaturated nitriles, is inhibited when such nitriles are subjected to elevated temperatures during purification by distillation by incorporating therein a minor amount of a mixture of p-aminophenol and a reducing agent such as sodium thiosulfate, sodium bisulfite or sodium oxalate. For the purpose of this invention, a "crude" unsaturated nitrile is defined as a nitrile containing from 85–95% of the nitrile in conjunction with minor amounts of compounds usually produced simultaneously in the catalytic reaction of hydrocarbons and HCN to produce the unsaturated nitrile. Such contaminating impurities usually consist of small amounts of other nitriles, water, carbonyl compounds, cyanohydrins, labile chlorides, organic acids and the like. When distilled in the presence of the mixture of inhibitors of the invention, crude unsaturated nitriles exhibit significantly greater resistance to polymerization than they do in the presence of either of the individual compounds. In fact, the reducing agents themselves show little, if any, ability to inhibit polymerization of the nitriles of or by themselves. The mixture of inhibitors thus exhibits a synergistic effect in the inhibition of polymerization of the unsaturated nitriles. This is borne out in the following example which is presented to illustrate the invention but which, however, is not to be construed as limiting it in any manner whatsoever.

EXAMPLE 1

A series of polymerization tests were conducted on crude acrylonitrile free of inhibitor, crude acrylonitrile containing p-aminophenol, crude acrylonitrile containing a reducing agent such as sodium thiosulfate, sodium bisulphite, or sodium oxalate, and crude acrylonitrile containing a mixture of p-aminophenol and a reducing agent such as sodium thiosulfate, sodium bisulfite, or sodium oxalate with varying proportions of reducing agent being employed. The crude acrylonitrile samples employed had compositions within the following approximate ranges expressed in weight percent: acrylonitrile, 89 to 93%; lactonitrile, 3.6 to 7.3%; acetonitrile 0.05 to 0.1%; crotononitrile, 0.4 to 0.6%; acetaldehyde, 0.2 to 0.3%; methyl vinyl ketone, 0.1%; acetone, 0.01 to 0.02%; cyanobutadiene, 2.1 to 3.5%. An 85-ml. sample of the crude acrylonitrile to be tested was charged to a 100-ml. round-bottomed flask fitted with a heating mantle, heated rapidly to reflux temperature, and maintained under conditions of total reflux at atmospheric pressure. The heating mantles were lowered at regular intervals (5 minutes) and the flasks were examined with a flashlight to detect turbidity or cloudiness of the solution, a condition indicative of polymerization since the polymer is insoluble in the monomer. The period of time from the beginning of refluxing to the appearance of turbidity or polymer particles in the monomer was recorded and termed the induction period or time to polymerization. Data obtained on the samples tested are presented in Table I.

*Table 1*

| Inhibitor system: | Induction period (minutes) |
|---|---|
| None | 13–22 |
| 100 p.p.m.[1] p-aminophenol (p-AP) | 41–60 |
| 1500 p.p.m. sodium thiosulfate ($Na_2S_2O_3$) | 35–41 |
| 1500 p.p.m. $Na_2S_2O_3$ plus 100 p.p.m. p-AP | 150–180 |
| None | 5–10 |
| 100 p.p.m. p-AP | 10–15 |
| 1500 p.p.m. sodium bisulfite ($NaHSO_3$) | 5–10 |
| 1500 p.p.m. $NaHSO_3$ plus 100 p.p.m. p-AP | 30–45 |
| None | 5–10 |
| 100 p.p.m. p-AP | 10–15 |
| 1500 p.p.m. sodium oxalate | 5–10 |
| 1500 p.p.m. sodium oxalate plus 100 p.p.m. p-AP | 30–45 |

[1] Parts by weight per million parts by weight of acrylonitrile.

The results set forth in Table I above clearly show the surprising synergistic stabilizing effect of a mixture of p-aminophenol and certain reducing agents on the unsaturated nitrile.

While the preceding examples have illustrated specific embodiments of this invention, obviously substantial variation is possible without departing from the scope thereof. For example, the quantity of p-aminophenol used to inhibit the polymerization of the crude nitriles can be varied widely depending upon the particular nitrile to be stabilized and the degree of inhibition desired. In general, only minor amounts of the aminophenol are employed. In fact, an advantage of this inhibitor is that it can be used in extremely small quantities. Concentrations in the range of from about 10 to about 1000 parts by weight of the aminophenol per million parts of the nitrile are preferred. These low concentrations afford adequate stability during distillation of the crude nitriles and greatly simplify subsequent processing of the nitrile. Higher concentrations, however, can be used if desired resulting in a nitrile monomer ever more strongly inhibited against polymerization.

The quantity of the reducing agent used in conjunction with the p-aminophenol to inhibit the polymerization of unsaturated nitriles can also be varied widely. In general, from about 100 to about 2000 parts by weight of reducing agent per million parts by weight of the nitrile are used with from about 500 to about 1500 parts by weight of reducing agent being preferred. Usually at least 100 parts of reducing agent per million parts of the nitrile are necessary before any synergistic effect is mainfested. Higher concentrations can be used if desired.

To inhibit polymer formation during distillation of the crude unsaturated nitrile, the inhibitors can be added to the feed stream to the column or introduced separately at some point in the distillation column. Preferably, the inhibitors are introduced at the top of the column to provide maximum inhibition throughout the entire system.

The α,β-unsaturated nitriles which in their crude state respond readily to the stabilizing effect of the inhibitor mixture disclosed herein are those of the formula

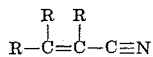

wherein the R's are the same or different and are selected from the group consisting of hydrogen, the halogens, and hydrocarbon radicals containing from 1 to 18 carbon atoms. The hydrocarbon radicals may be cyclic or acyclic, saturated, unsaturated or aromatic such as the alkyl, alkenyl, aryl, alkaryl, alkenaryl, aralkyl, aralkenyl, cycloalkyl and cycloalkenyl radicals. Examples of such hydrocarbon radicals are methyl, ethyl, propyl, isopropyl, n-butyl, isobutyl, tert-butyl, hexyl, n-octyl, trimethyldecyl, allyl, methallyl, vinyl, carbinyl, pentenyl, hexenyl, phenyl, diphenyl, naphthyl, anthryl, tolyl, dipropylnaphthyl, cyclohexenyl, trimethylcyclohexyl, cyclopentenyl, and the like. Acrylonitrile, α-substituted acrylonitriles wherein the substituent on the α-carbon atom is an alkyl radical containing from 1 to 8 carbon atoms and β-substituted acrylonitriles where in the substituent on the β-carbon atom is an alkyl radical containing from 1 to 8 carbon atoms represent a class of monomers which polymerize very readily but which can be most effectively inhibited against polymerization by means of inorganic and organic nitrites according to the process of the present invention. Specific examples of nitriles included in the classes described, in addition to acrylonitrile already exemplified, are methacrylonitrile, crotononitrile, α-ethylacrylonitrile, β-hexylacrylonitrile, α,β-dimethylacrylonitrile, β-butylacrylonitrile, α-chloroacrylonitrile, β-ethylacrylonitrile, α-naphthylacrylonitrile, βcyclohexenylacrylonitrile, α-phenylacrylonitrile, and α-pentenylacrylonitrile.

What is claimed is:
1. A process for inhibiting the polymerization during distillation of a crude unsaturated nitrile of the formula

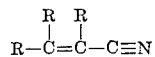

wherein R is chosen from the group consisting of hydrogen and hydrocarbon radicals containing from 1 to 18 carbon atoms which comprises distilling said crude nitrile in the presence of a minor amount of p-aminophenol and in conjunction therewith a minor amount of a reducing agent chosen from the group consisting of sodium thiosulfate, sodium bisulfite and sodium oxalate.

2. The process of claim 1 wherein the amount of p-aminophenol is in the range from about 10 to about 1000 parts by weight per million parts by weight of the nitrile and the amount of said reducing agent is in the range from about 100 to about 2000 parts by weight per million parts by weight of said crude nitrile.

3. A process for inhibiting the polymerization of crude acrylonitrile during distillation which comprises distilling said crude nitrile in the presence of a minor amount of p-aminophenol and in conjunction therewith a minor amount of a reducing agent chosen from the group consisting of sodium thiosulfate, sodium bisulfite and sodium oxalate.

4. The process of claim 3 wherein the amount of p-aminophenol is in the range from about 10 to about 1000 parts by weight per million parts by weight of said acrylonitrile and the amount of reducing agent is in the range from about 100 to about 2000 parts by weight per million parts by weight of said acrylonitrile.

5. A process for inhibiting the polymerization of crude acrylonitrile during distillation which comprises distilling said acrylonitrile in the presence of from about 10 to about 1000 parts by weight per million parts by weight of said acrylonitrile of p-aminophenol in conjunction with from about 100 to about 2000 parts by weight per million parts by weight of said acrylonitrile of sodium thiosulfate.

6. A process for inhibiting the polymerization of crude acrylonitrile during distillation which comprises distilling said acrylonitrile in the presence of from about 10 to about 1000 parts by weight per million parts by weight of said acrylonitrile of p-aminophenol in conjunction with from about 100 to about 2000 parts by weight per million parts by weight of said acrylonitrile of sodium bisulfite.

7. A process for inhibiting the polymerization of crude acrylonitrile during distillation which comprises distilling said acrylonitrile in the presence of from about 10 to about 1000 parts by weight per million parts by weight of said acrylonitrile of p-aminophenol in conjunction with from about 100 to about 2000 parts by weight per million parts by weight of said acrylonitrile of sodium oxalate.

References Cited in the file of this patent
UNITED STATES PATENTS 2,573,294   Ackerman et al. _____ Oct. 30, 1951
2,726,258   Stehman _____ Dec. 6, 1955
2,799,697   Maxion _____ July 16, 1957